United States Patent Office 2,807,630
Patented Sept. 24, 1957

2,807,630

ADDITION COMPOUNDS OF THE ANTHRAQUINONE SERIES

Walter Jenny, Reinach, Switzerland, assignor to Ciba Limited, Basel, Switzerland, a Swiss firm No Drawing. Application June 28, 1954,
Serial No. 439,901

Claims priority, application Switzerland July 1, 1953

5 Claims. (Cl. 260—369)

According to this invention valuable new addition compounds are made by reacting a compound which yields the radical of the formula (1)         Aq—S— in which Aq represents a vattable radical bound to the sulfur atom by an aryl-carbon atom, with an unsaturated organic compound.

As starting materials, which yield the radical of the Formula 1, there come into consideration more especially sulfenyl-thiocyanates and sulfenyl halides, for example, sulfenyl bromides, of the constitution (2)         Aq—S-halogen or (3)         Aq—S—SCN The vattable radical Aq may be, for example, an anthraquinone radical which is bound to the sulfur atom in the 1- or 2-position. If desired this radical may contain further substituents or it may be free from further substituents as in the case of the radical of the constitution (4)
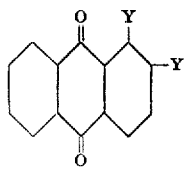

in which one Y represents a hydrogen atom and the other Y an —S-halogen group or —S—SCN group.

The unsaturated compounds, with which the vattable starting material defined above is additively combined, advantageously contained as the unsaturated group a >C=C< grouping. Especially advantageous are unsaturated compounds which contain a

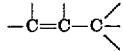

grouping, that is to say, compounds which contain an ethylene group bound on at least one side to a further carbon atom, as for example in the case of cycloalkylenes, especially cyclohexenes, sytrenes and allyl compounds. As examples of such compounds there may be mentioned cyclohexene, styrene, 2-methyl-1-phenylethylene, 1-methyl-1-phenylethylene, allylbromide, isobutylene and butadiene.

The reaction is advantageously carried out in an organic solvent such, for example, as glacial acetic acid, chloroform or tetrachlorethane, at a raised temperature. There are obtained addition products of the constitution (5)         Aq—S—R in which Aq represents a vattable radical bound to the sulfur atom by an aryl-carbon atom, and R represents an organic radical of which a carbon atom is bound directly to the sulfur atom, the latter carbon atom being bound directly to a further carbon atom of the radical R.

Of special interest are the addition products obtainable from a compound of the Formula 2 or 3 and a compound containing a —CH=CH— group, and having the formula (6)
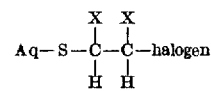

or (7)
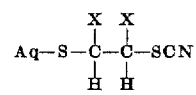

in which Aq has the meaning given above and both X's represent hydrogen atoms or together with the —C—C— group form an advantageously carbocyclic ring, or in which one X represents a hydrogen atom and the other X an organic radical, for example, an aromatic radical of the benzene series.

Thus, there are obtained from starting materials of the Formula 4 addition products of the formula (8)
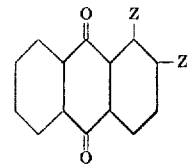

in which one Z represents a hydrogen atom and the other Z a group of the consitution

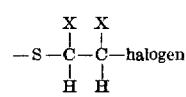

or

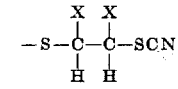

in which the two X's have the meanings given above.

Thus, with the aid of the unsaturated compounds described above, there can be obtained, for example, addition products of the following constitutions:

(a) Compounds of the Formula 8, in which one Z represents a radical of the constitution

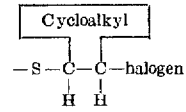

or

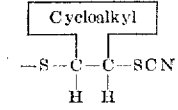

and especially a radical of the formula

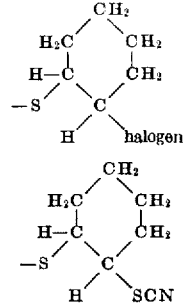

(b) Compounds of the Formula 8, in which one Z represents a radical of the constitution

—S—R₁ in which R₁ represents an ethyl-benzene radical, of which one carbon atom of the ethyl group is bound to the sulfur atom and the other carbon atom to a halogen atom.

(c) Compounds of the Formula 8, in which one Z represents a radical of the constitution

—S—R₂ in which R₂ represents a dihalogen-propyl radical.

Depending on the nature of the unsaturated compound used, the reaction with the sulfenyl halide may in some cases be accompanied by the splitting off of hydrogen halide to form a vinyl sulfide of the formula (9)
$$Aq-S-\underset{X}{\overset{X}{C}}=CH$$

in which Aq and X have the meanings given above. This is the case, for example, in the reaction of anthraquinone-1-sulfenyl bromide with 1-methyl-1-phenyl-ethylene. Accordingly, there can also be obtained by the present process, for example, compounds of the formula

(10)
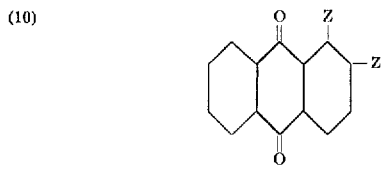

in which one Z represents a hydrogen atom and the other Z a radical of the constitution

—S—R₃ in which R₃ represents an ethylene radical bound by an ethylene carbon atom to the sulfur atom.

With regard to the constitution of the compounds obtainable by the present process it can be assumed that preferential combination takes place between the sulfur atom of the vattable compound and the carbon atom of the ethylene group which is richer in hydrogen, when the two carbon atoms of the ethylene group differ from one another in this respect.

Further reactions can be carried out with the compounds of the Formulae 5 to 8. Thus, for example, the halogen atom of a compound of the Formula 5 can be exchanged for a primary, secondary or tertiary amino group, an —O-acyl group, such as an —O-acetyl group, an alkoxy or hydroxyl group. A hydroxyl group may also be formed by hydrolysis of an —O-acyl group. All these reactions can be carried out by methods in themselves known.

The new compounds of the Formulae 5 to 8, and the compounds obtainable therefrom in the manner described in the preceding paragraph, are valuable intermediate products which are suitable, for example, for the manufacture of vat dyestuffs. Furthermore they can be used directly as dyestuffs, for example, as pigments, and especially as dispersion dyestuffs for dyeing or printing cellulose acetate artificial silk or polyamide fibers or fibers of polyesters of aromatic dicarboxylic acids.

Particularly valuable are the compounds of the formula

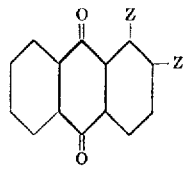

in which one Z represents a hydrogen atom and the other Z represents one of the radicals

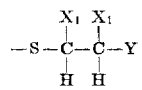

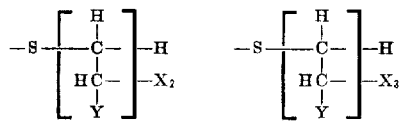

or

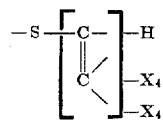

in which both X₁'s together with the —C—C-group represent a cycloalkyl radical, for example, a cyclohexyl radical, X₂ represents a benzene radical, X₃ represents an alkyl radical, for instance a methyl group or a halogen-methyl group, one X₄ represents a benzene radical and the other X₄ an alkyl, for example a methyl radical and Y represents a chlorine atom, a bromine atom, an NCS-group, an —O-acyl group such as, for example, an —O-acetyl group, an alkoxy, preferably a methoxy group or a hydroxyl group.

The following examples illustrate the invention, the parts and percentages being by weight unless otherwise stated and the relationship of parts by weight to parts by volume being the same as that of the kilogram to the liter.

*Example 1*

10 parts of anthraquinone-1-sulfenyl bromide (obtainable as described by Fries, Berichte, vol. 45, page 2967 [1912]), 12 parts of cyclohexene and 250 parts of glacial acetic acid are boiled together under reflux for 10 minutes. Upon cooling the hot filtered solution handsome small yellow needles crystallize out. The latter are filtered off with suction, washed with alcohol and petroleum ether, and dried in vacuo at 60° C. In this manner about 8.5 parts of 1-(2'-bromo-cyclohexyl-mercapto)-anthraquinone of the formula

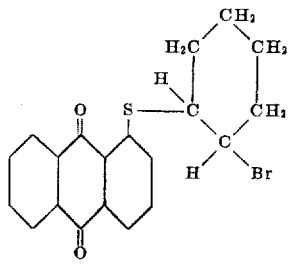

are obtained. The latter product melts at 174–175° C. Analysis of a product so obtained, after recrystallization from glacial acetic acid, gave the following results:

$C_{20}H_{17}O_2SBr$ (401.3)—Calculated: C=59.85, H=4.27, S=7.99, Br=19.91%. Found: C=59.99, H=4.44, S=7.88, Br=20.20%.

*Example 2*

1 part of 1-(2'-bromo-cyclohexylmercapto)-anthraquinone is dissolved in 30 parts by volume of hot glacial acetic acid, the whole is mixed with 1 part of silver acetate and boiled for a few minutes. After cooling it the mixture is allowed to stand for 3 hours, filtered, the filtrate is mixed with water, the resulting precipitate is filtered off with suction, and washed with water. The resulting 1-(2'-acetoxy-cyclohexylmercapto)-anthraquinone of the formula

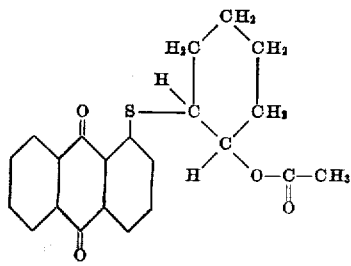

crystallizes from ethanol in the form of small yellow needles, which melt at 168° C. A product prepared in this manner and further purified by additional recrystallization from ethanol, melted at 169–170° C. and gave the following analysis:

$C_{22}H_{20}O_4S$ (380.4)—Calculated: C=69.45, H=5.30, S=8.43%. Found: C=69.61, H=5.33, S=8.11%.

Example 3

2 parts of 1-(2'-bromo-cyclohexyl)-mercaptoanthraquinone are suspended in 100 parts of absolute methanol, and mixed with a methylate solution prepared from 0.2 part of sodium and 20 parts of absolute methanol. After boiling the mixture for 2 hours under reflux, it is filtered and the filtrate is mixed with a large quantity of water. The yellow powder which precipitates is filtered off with suction, washed with water and dried. By recrystallization from ethanol there is obtained 1-(2'-methoxy-cyclohexyl)-mercapto-anthraquinone of the formula

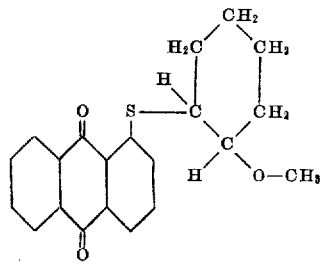

in the form of small yellow-orange crystals, which melt at 138–139° C. A product obtained in this manner had the following analysis:

$C_{21}H_{20}O_3S$: Calculated: C=71.56, H=5.72, S=9.10%. Found: C=71.41, H=5.42, S=9.36%.

Example 4

3.5 parts of 1-(2'-acetoxy-cyclohexyl)-mercaptoanthraquinone are dissolved hot in 400 parts of ethanol. After adding a solution of 3.5 parts of potassium hydroxide, 35 parts of water and 315 parts of ethanol, the whole is boiled for 2 hours under reflux. After cooling the mixture, a large quantity of water is added, the whole is filtered with suction, and the filter residue is washed with water and dried. The resulting 1-(2'-hydroxycyclohexyl)-mercapto-anthraquinone of the formula

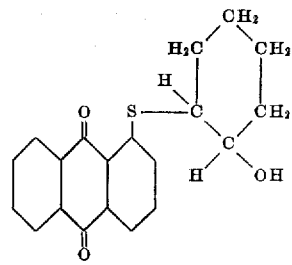

is an orange powder, which can be recrystallized from alcohol.

Example 5

5 parts of anthraquinone-2-sulfenyl chloride are boiled under reflux for 15 minutes with 10 parts of glacial acetic acid and 6 parts of cyclohexene. Upon cooling the mixture, the addition product crystallizes out in the form of yellow crystals. The latter are filtered off with suction, washed with alcohol, and recrystallized, for example, from glacial acetic acid, in the form of coalesced lemon yellow needles melting at 131–132° C. S (calculated)=8.98%, S (found)=9.14%.

Example 6

3.19 parts of anthraquinone-1-sulfenyl bromide are boiled under reflux for 15 minutes with 75 parts of glacial acetic acid and 3.2 parts of freshly distilled styrene. After cooling the mixture, a small amount of precipitated dianthraquinonyl-1:1'-disulfide is filtered off, and the solution is allowed to crystallize after being concentrated to half its volume. The yellow crystals so obtained can be recrystallized from benzene. The addition product melts at 142° C. Bromine (calculated)=18.9%; bromine (found)=18.93%.

Example 7

5 parts of anthraquinone-2-sulfenyl chloride are boiled under reflux for 1½ hours with 30 parts of chloroform and 4 parts of freshly distilled styrene. After allowing the mixture to stand for a long time in a mixture of ice and water, the precipitated crystals are filtered off with such suction and recrystallized from benzene. The pure substance melts at 159° C. Sulfur (calculated)=8.46%; sulfur (found)=8.29%.

Example 8

2.97 parts of anthhraquinone-1-sulfenyl thiocyanate are boiled under reflux for one hour with 50 parts of glacial acetic acid and one part of cyclohexene. After cooling the mixture, it is filtered to remove a small amount of precipitated dianthraquinonyl-1:1'-disulfide, and the filtrate is evaporated in vacuo until crystallization sets in. The yellow addition product is dissolved and reprecipitated several times from benzene or a mixture of benzene and petroleum ether. N (calculated)=3.69%, N (found)=3.85%.

Anthraquinone-1-sulfenyl thiocyanate may be prepared, for example, as follows:

3.19 parts of anthraquinone-1-sulfenyl bromide are stirred for 24 hours at room temperature with 1 part of dried and finely pulverized potassium thiocyanate in 50 parts of dry chlorobenzene. The suspension is filtered with suction and the filter residue is thoroughly washed with alcohol and water. By recrystallization from ethyl acetate the sulfenyl thiocyanate is obtained in the form of small pale yellow needles, which melt at 208° C.

Analysis:

|  | S | N |
|---|---|---|
|  | Percent | Percent |
| Calculated | 21.58 | 4.72 |
| Found | 21.46 | 4.81 |

Example 9

16 parts of anthraquinone-1-sulfenylbromide and 9 parts of 1-methyl-1-phenyl-ethylene are boiled in 40 parts of glacial acetic acid until hydrogen bromide is no longer formed. Upon cooling the hot filtered solution, a 1-(phenyl-vinyl-mercapto)-anthraquinone crystallizes out in golden yellow crystals. The reaction product has the probable formula

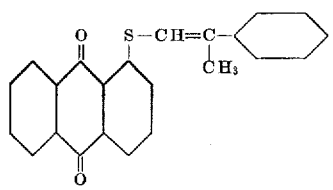

It crystallizes from glacial acetic acid or alcohol in the form of yellow crystals which melt at 154° C.

Analysis:

|  | C | H | S |
|---|---|---|---|
| Calculated | Percent 77.50 | Percent 4.52 | Percent 9.00 |
| Found | 77.53 | 4.55 | 9.11 |

*Example 10*

16 parts of anthraquinone-1-sulfenyl bromide and 12 parts of freshly distilled allyl bromide are boiled for one hour in 40 parts of glacial acetic acid. Upon cooling the hot filtered solution the addition product crystallizes out in yellow crystals. By crystallization from alcohol there is obtained a crystalline yellow powder, which melts at 138° C. The reaction product so obtained having the probable formula

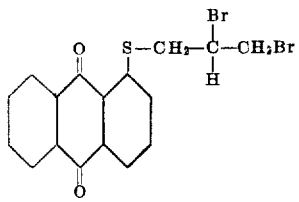

gave the following analysis:

|  | C | H |
|---|---|---|
| Calculated | Percent 46.39 | Percent 2.75 |
| Found | 46.36 | 2.84 |

*Example 11*

0.5 part of the 1-(2'-bromo-cyclohexyl-mercapto)-anthraquinone obtained as described in Example 1 is dissolved at 0° C. in 10 parts of sulfuric acid of 90 per cent strength, the solution is poured on to ice and water, and then filtered. The filter cake is ground in a roller mill with 1 part of dried sulfite cellulose waste liquor. The resulting suspension is added to a dyebath, which contains 3000 parts of water and 9 parts of soap, and 100 parts of well wetted cellulose acetate artificial silk are entered into the dyebath at 40° C., the temperature is raised to 80° C. and dyeing is carried on for one hour at 80–85° C. Cellulose acetate artificial silk is dyed yellow.

Instead of cellulose acetate artificial silk, nylon may also be dyed in the manner described above. The products of the other examples can also be used in the above manner for dyeing cellulose acetate artificial silk or nylon.

What is claimed is:

1. A compound of the formula

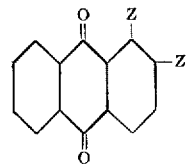

in which one Z represents a hydrogen atom and the other Z represents a radical selected from the group of radicals of the formulae

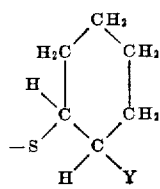

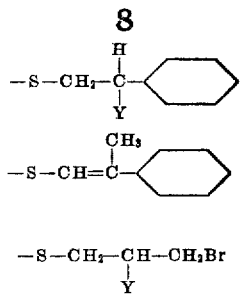

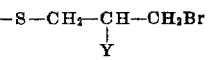

and $$-S-CH_2-CH-CH_2Br$$
$$\phantom{-S-CH_2-CH-}Y$$

Y representing a member selected from the group consisting of Cl, Br, —SCN, acetoxy, methoxy and hydroxy.

2. The compound of the formula

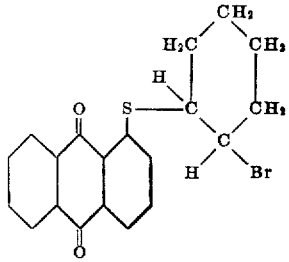

3. The compound of the formula

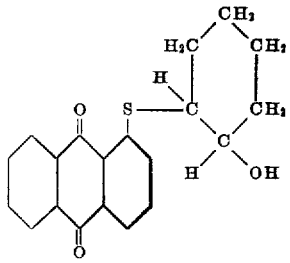

4. The compound of the formula

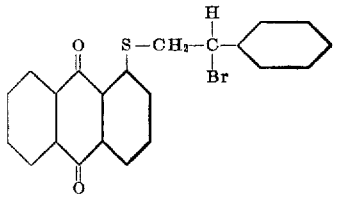

5. The compound of the formula

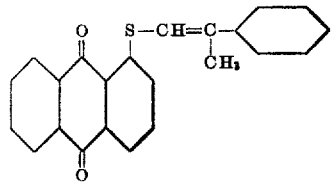

References Cited in the file of this patent

UNITED STATES PATENTS

| 2,073,589 | Reppe et al. | Mar. 9, 1937 |
| 2,109,464 | Cantrell et al. | Mar. 1, 1938 |
| 2,187,819 | Koeberle et al. | Jan. 23, 1940 |
| 2,647,124 | Hardy et al. | July 28, 1953 |
| 2,671,113 | Kharasch et al. | Mar. 2, 1954 |

FOREIGN PATENTS

| 442,607 | Great Britain | Feb. 12, 1936 |

OTHER REFERENCES

Ber. Deut. Chem., vol. 44, pages 3125–3132 (Ullmann et al.) October 25, 1911.

Synthetic Organic Chem., Wagner et al. Pub. John Wiley & Sons, Inc. (N. Y.), 1953, page 788.

UNITED STATES PATENT OFFICE
CERTIFICATE OF CORRECTION

Patent No. 2,807,630                                                                             September 24, 1957

Walter Jenny

It is hereby certified that error appears in the printed specification of the above numbered patent requiring correction and that the said Letters Patent should read as corrected below.

Column 1, line 49, for "contained" read -- contain --; line 58, for "sytrenes" read -- styrenes --; column 2, between the last two formulas insert "or"; column 6, line 26, before "suction" strike out -- such --; line 31, for "anthhraquinone-" read -- anthraquinone- --.

Signed and sealed this 19th day of November 1957.

(SEAL)

Attest:

KARL H. AXLINE
Attesting Officer

ROBERT C. WATSON
                                                                             Commissioner of Patents